United States Patent
Schreiber

(10) Patent No.: US 7,853,434 B2
(45) Date of Patent: Dec. 14, 2010

(54) METHOD AND CONTROL SYSTEM FOR OPERATING A TECHNICAL INSTALLATION COMPRISING A PLURALITY OF COMPONENTS, IN PARTICULAR A COMBUSTION SYSTEM FOR GENERATING ELECTRIC ENERGY

(75) Inventor: Roland Schreiber, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 891 days.

(21) Appl. No.: 10/568,339

(22) PCT Filed: Dec. 1, 2003

(86) PCT No.: PCT/EP03/13515

§ 371 (c)(1),
(2), (4) Date: Oct. 16, 2006

(87) PCT Pub. No.: WO2005/024530

PCT Pub. Date: Mar. 17, 2005

(65) Prior Publication Data

US 2009/0030653 A1    Jan. 29, 2009

(30) Foreign Application Priority Data

Aug. 13, 2003  (EP) .................................. 03018411

(51) Int. Cl.
*G06F 11/30* (2006.01)

(52) U.S. Cl. ..................................................... 702/183
(58) Field of Classification Search .................. 702/57, 702/58, 60, 64, 182–184, 188; 700/287, 700/291, 297

See application file for complete search history.

(56) References Cited

U.S. PATENT DOCUMENTS 7,181,321 B2 * 2/2007 Schlicker et al. ............ 700/297
2002/0123828 A1   9/2002 Bellmann et al.
2004/0161715 A1   8/2004 Schlicker et al.

FOREIGN PATENT DOCUMENTS

DE     197 44 230 A1    4/1999
JP       61285314 A     12/1986
WO    WO 02/052199 A1   7/2002

* cited by examiner

*Primary Examiner*—Mohamed Charioui

(57) ABSTRACT

The invention relates to an inventive method and a corresponding control system according to which: during the operation of the technical installation, each component that is in operation or out of commission triggers an evaluation of at least one other component by means of a value; the values of each component are totalled and the totalled values are used to determine the next components that are to be activated or deactivated. At least one initialization value is assigned to at least one component and added to the totalled values of the component.

8 Claims, 2 Drawing Sheets

METHOD AND CONTROL SYSTEM FOR OPERATING A TECHNICAL INSTALLATION COMPRISING A PLURALITY OF COMPONENTS, IN PARTICULAR A COMBUSTION SYSTEM FOR GENERATING ELECTRIC ENERGY

CROSS REFERENCE TO RELATED APPLICATION

This application is the US National Stage of International Application No. PCT/EP2003/013515, filed Dec. 1, 2003 and claims the benefit thereof. The International Application claims the benefits of European Patent application No. 03018411.3 EP filed Aug. 13, 2003, both of the applications are incorporated by reference herein in their entirety.

FIELD OF THE INVENTION

The invention relates to a method and control system for operating a technical installation comprising a plurality of components, wherein during the operation of the technical installation each component which is placed into operation or taken out of operation initiates an evaluation of at least one other component by means of a numerical value, the numerical values of each component are totaled, and the totaled numerical values are used to determine those components which are to be activated or deactivated next.

BACKGROUND OF THE INVENTION

The technical installation is preferably a combustion system for generating electric energy.

Technical installations generally comprise a plurality of components which, for example, either each implement a specific function of the technical installation or collectively perform a specific function.

An example of a technical installation in which components performing different functions interwork is, for example, a power plant for generating electrical energy. To be able to generate electrical energy in a technical installation of this type, the interaction of numerous components, each fulfilling a different task, is necessary:

The turbines, generators, protective systems and control system should be cited here as examples of the most important components. Efficient operation of a technical installation of said type is only possible if the use of the components mentioned is coordinated.

In modern technical installations, said interaction between the components of the technical installation is usually coordinated and monitored by a computer-aided control system. In this case the degree of automation is often very high, so human interventions in the operation of the technical installation are only necessary if the automatic controller is required to deal with a current operating state of the technical installation for which no solution or procedure is provided in the control programs of the control system. This may for example comprise problem incidents which could not be taken into account in every detail when the control system was designed, but can also relate to operational transitions during operation of the technical installation which, though in themselves simple from a human viewpoint, often can only be mapped as engineering control-related programs with a considerable amount of effort. This may be the case, for example, whenever a plurality of possible operating states can occur during the operation of the technical installation and the aim is for it to be possible to reach a desired operating state from each of these operating states.

A control program would then have to contain associated control instructions for each of these possible operating states in order to go to the desired operating state. The capturing of all possible operating states of a technical installation in a control program is often not possible in advance, so that in some cases the operating personnel of the technical installation have to take over control and operate the components of the technical installation manually.

The problems described above are similar in the case of a technical installation in which a number of components interwork in order to perform a certain function. An example of a technical installation of this type is a combustion system for generating electrical energy, which system comprises a number of burners arranged in a combustion chamber. In this case the burners are designed to be used in such a way that the fuel supplied is consumed as efficiently as possible in order to generate a required amount of electrical energy and to operate the installation economically. Furthermore, the aim should be to operate an installation of this type in a resource-friendly manner, which objective can be achieved for example by uniform distribution of the firing in the combustion chamber.

In order to use the fuel supplied as efficiently as possible it is necessary, in particular when starting up and shutting down the technical installation and in the partial load operating range—that is to say when the demand is less than the maximum possible amount of electrical energy that can be generated by the combustion system and not all the burners are firing simultaneously—, to switch the burners on or off selectively in such a way that the most uniform possible distribution of firing in the combustion chamber is ensured at every point in time in the operation of the technical installation.

Real-world operation of many power plants reveals that, for example in the case of the solution to the aforementioned problem of uniform distribution of firing in a combustion chamber, automatic switching on and off of the main burners is often dispensed with, because the logic or step controllers typically used for accomplishing such tasks can only be implemented with a very great amount of overhead, while the control programs that may be used for such purposes are also very complicated. The reason for the high overhead is that when a combustion system having a plurality of burners is in operation, practically every operating state between no load and full load, including the associated starting-up and shutting-down operations, may occur. A control program would then have to be able to execute corresponding control instructions for each of these numerous operating states in order to ensure efficient operation of the technical installation.

In order to avoid, at least in part, the described problem of high overhead, use is made in many power plants of logic and step controllers in which corresponding control commands are provided only for a subset of all the possible operating states. However, by this deliberate restriction to defined operating cases, controllers of said type have little flexibility and human intervention continues to be necessary for all those operating cases for which no control commands are provided in the controllers. In order to solve, for example, the problem of uniform distribution of the firing in a combustion chamber of a combustion system, solutions are also conceivable in which additional measuring devices are provided, for example for measuring the temperature profile in the combustion chamber, in order then to evaluate these measurements and consequently control use of the burners.

A disadvantage in this case is that additional devices such as, for example; the said measuring devices for determining the temperature profile, are necessary. Furthermore, these additional measurements have to be evaluated in order to derive from them control commands for use of the burners.

The additional overhead is in this case often considerable. Moreover, potential sources of trouble are imposed on the technical installation due to the addition of further measuring devices which, in the event that they do not function, can lead to the shutdown of the technical installation.

WO02/052199 discloses a generic device (see FIG. 1) by means of which economical operation of a technical system consisting of multiple components is achieved in that each component that is placed into or taken out of operation continuously triggers an assessment of at least one other component by means of a value, the values of each component are added together, and the added values are used to determine which components are to be activated or deactivated next.

The methods and devices disclosed in this publication permit startup and/or shutdown commands to be determined for components on the basis of a current operating state of the components, with the result that a desired operating state of the technical installation is reached. In the case of a firing plant, for example, a symmetrical flame pattern is formed by the burners used.

This is achieved in that each component is assigned at least one numerical value in relation to its arrangement in the technical installation, together with at least one further numerical value which comprises an operating state of the technical installation. A total numerical value is then determined for each component by summation, so that it can be determined, based on the totaled numerical values of the components, which components are to be placed into or taken out of operation next.

A disadvantage in this case is that, starting from an installation that is out of service (all components are out of operation) or starting from an operating situation in which all components of the technical installation are in operation, a number of options exist in relation to which components are to be put into or taken out of operation next. Quite generally, there are usually also further operating states of the technical installation, starting from which a number of startup or shutdown variants equivalent to one another are possible.

In such cases a method and a device according to WO02/052199 cannot unequivocally specify which components are to be switched on or off next in order to reach a desired operating state.

SUMMARY OF THE INVENTION

The invention is therefore based on the object of providing a method and a corresponding device of the kind cited at the beginning by means of which it can be unequivocally determined, starting from the basis of as many different operating situations of the technical installation as possible, which components are to be activated or deactivated next.

With regard to the method, the object is achieved by a generic method of the type cited at the beginning, wherein at least one component is assigned at least one initialization value and said initialization value is added to the totaled numeric values of the component.

In this scheme said initialization value modifies the total value of the numerical values of at least one component. As a result, an initially symmetrical operating situation of the technical installation, which was also originally reflected in a symmetrical distribution of the total values of the components, is rendered at least slightly unsymmetrical in terms of the distribution of the numerical values, with the result that it is now possible to reach an unequivocal decision, based on the total values determined according to the invention which correspond to the total of the summated numerical values and the initialization values, on which components are to be activated or deactivated next.

In this case the initialization value can preferably include a numeric constant which is added to the summated numerical values of the corresponding component.

In this way it is ensured that the component's priority with which it is to be placed into or taken out of operation is shifted, thereby producing an unequivocal result with regard to activation or deactivation in the further processing of the total values of the components.

The initialization value can be specified manually here or determined by means of an upstream processing unit.

Furthermore, the initialization value can include a constant value which is passed to the summators of the corresponding components following a desired preselection of one or more components. In this way it can also be achieved in particular that, starting from any operating states, the component's can be switched on and off in any order.

At least one operating criterion is advantageously assigned to at least one component and said operating criterion influences the initialization value of the component.

In this case the operating criterion comprises, for example, information relating to the operating hours of the components of the installation. It can then be specified that the component with the most operating hours shall always be first to be put into operation again. A component of said kind is then assigned an initialization value which is influenced accordingly by the operating criterion and which is added, as described above, to the summated numerical values of the component, and the total obtained in this way is processed further.

When a component with a high number of operating hours is taken out of service for inspection, on completion of the inspection it is possible for reset commands to have an effect on the operating criteria and modify them in such a way that, for example, an operating hours counter included in the operating criteria is reset and consequently the value of the operating criterion is modified.

In addition to the components' operating hours cited by way of example, the operating criterion can include further wear-and-tear criteria. The effect on the initialization value can be determined for example in that the component whose operating criterion has the largest or smallest value is determined in a maximum value selection element. In this case the operating criterion of said component can additionally be compared with a reference value.

For example, a component has the highest operating hours value of 10,000 operating hours. This value is then compared with a reference value of, for example, 12,000 operating hours. As the current operating hours value of the component is below the reference value, there is nothing to prevent this component from being the next to be returned to operation, and the corresponding initialization value is set as appropriate, for example as a constant value.

In a further advantageous embodiment of the invention, a startup and/or shutdown command can be issued for at least one component based on operating state values of the components by means of at least one setpoint value specification.

With this embodiment it is ensured that an automatic response can be made to changed operating requirements or malfunctions. For example, a higher level of performance can be demanded of a firing plant by means of a setpoint value specification. Knowledge of the current operating state is then necessary as a starting point for the generation of startup and/or shutdown commands. This operating state is represented by the operating state values of the components. Starting from the basis of the current operating state values and the setpoint value specification, appropriate startup and/or shutdown commands can then be issued, by means of which a desired operating state of the components is reached in accordance with the setpoint value specification.

The invention further leads to a control system for operating a technical installation comprising a plurality of components, wherein during the operation of the technical installation each component which is placed into operation or taken out of operation initiates an evaluation of at least one other component by means of a numerical value, the numerical values of each component are totaled, and the totaled numerical values are used to determine those components which are to be activated or deactivated next, said control system having at least one actuation logic module by means of which at least one component is assigned at least one initialization value and said initialization value can be added to the summated numerical values of the component.

The control system advantageously also comprises an operating criteria logic module by means of which at least one component is assigned at least one operating criterion, said operating criterion influencing the initialization value of the component.

In a further advantageous embodiment the control system comprises switching logic by means of which, based on operating state values of the components and at least one setpoint value specification, a startup and/or shutdown command can be issued for at least one component.

BRIEF DESCRIPTION OF THE DRAWINGS

An exemplary embodiment of the invention is explained below with reference to the drawings, in which.

DETAILED DESCRIPTION OF THE INVENTION

Figure 1:
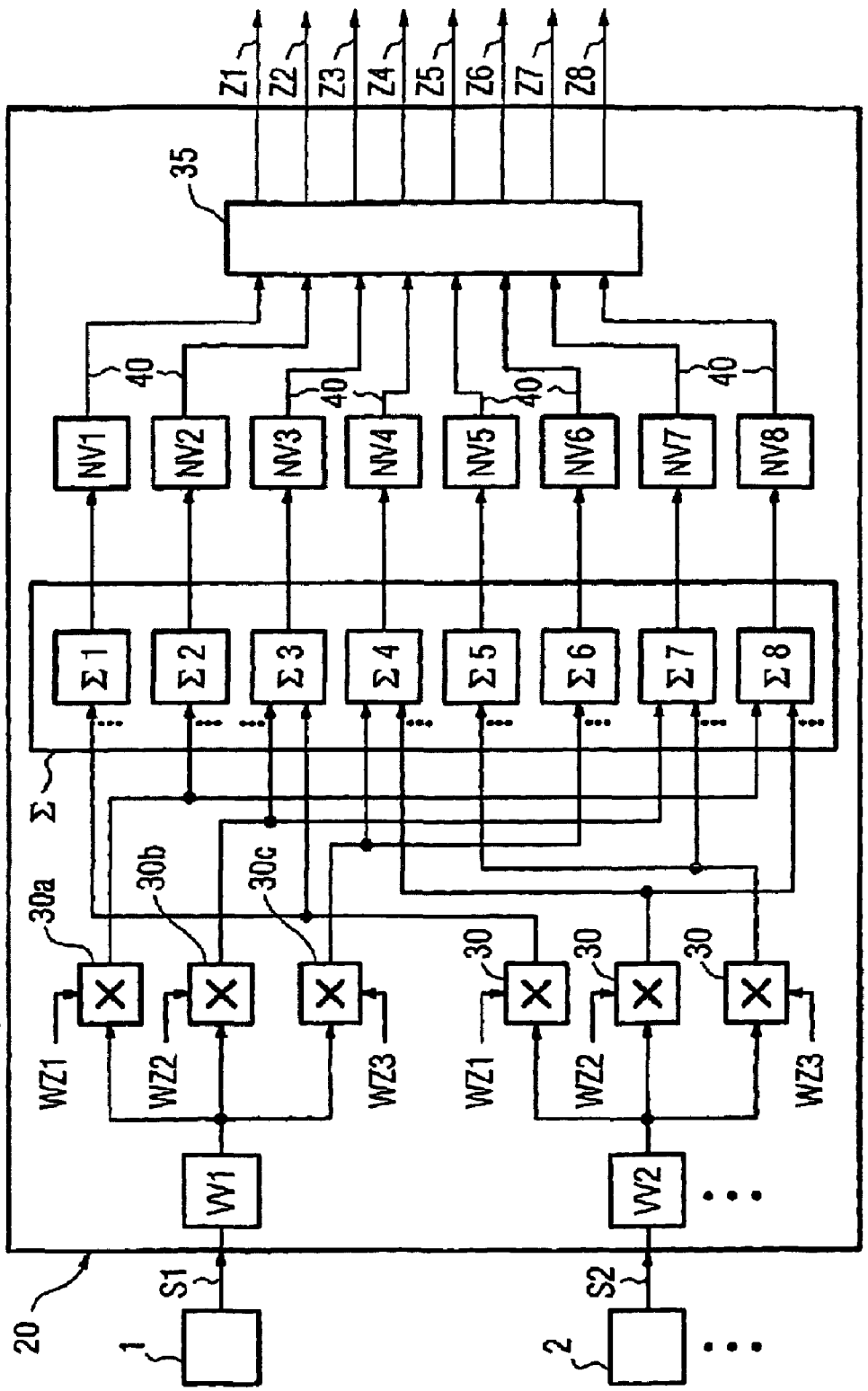
FIG. 1 shows a generic control system from the prior art.

FIG. 1 shows an example from the prior art cited at the beginning for the situation in which burners 1 and 2 of a furnace installation have been switched on and the resulting evaluation of other burners initiated thereby.

The computing unit 20 receives the operating state values S1 and S2 from the burners 1 and 2 respectively, which values in the present case carry at least the information that the relevant burner 1 or, as the case may be, 2 has been switched on.

The operating state values S1 and S2 are switched to signal preprocessing stages VV1 and VV2, respectively, of the computing unit 20. The signal preprocessing stages take the aforementioned information from the operating state values S1 and S2 and in each case assign an operating state number, for example the constant value 1, to the exemplary operating state present "burners 1 and 2 switched on".

The operating state number of each burner is switched to the multiplier 30 assigned to the respective burner. Said multipliers additionally receive at least one numerical value WZ1, WZ2 and WZ3 in each case as a further input signal.

These numerical values WZ1, WZ2 and WZ3 can correspond, for example, to the constant values 6, 3 and 1 respectively.

In the present case the activated burner 1 initiates an evaluation of the other burners 2, 8, 3, 7, 4 and 6; the activated burner 2 initiates an evaluation of the other burners 1, 3, 4, 8, 5 and 7.

Figure 2:
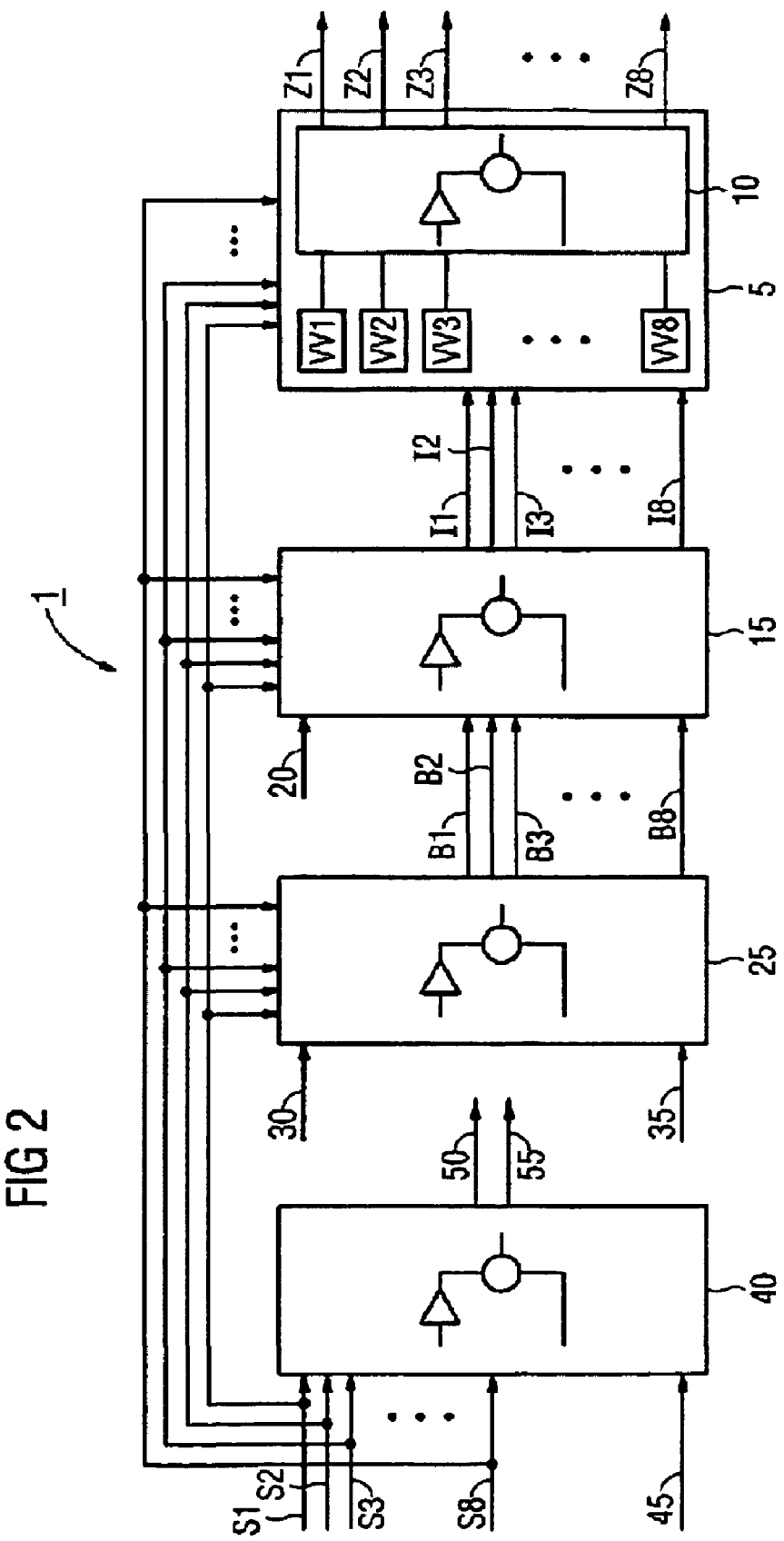
FIG. 2 shows a control system according to the invention.

The evaluation by the activated burner 1 is performed in the present exemplary embodiment as follows: the summators Σ2, Σ8, Σ3, Σ7, Σ4 and Σ6 assigned to the other burners 2, 8, 3, 7, 4 and 6, respectively, receive the output signals of the multipliers 30, as shown in FIG. 2, as input signals.

Each of the summators Σ1, Σ2, Σ3, Σ8 summates its associated input signals and passes the respective total value to downstream signal post-processing stages NV1, NV2, NV3, . . . NV8. The output signal of the respective summator Σ1, Σ2, Σ3, . . . Σ8 can, for example, be post-processed in the signal post-processing stages by, for example, the output of the summator connected upstream of the respective signal post-processing stage only being switched through to a processing unit 35 connected downstream of the signal processing stages if the burner assigned to the respective signal post-processing stage or, as the case may be, the respective summator is not in operation; if the respective burner is already in operation, then the relevant signal post-processing stage can, for example, pass a different value as the current evaluation 40 to the processing unit instead of the output value of the respective summator. Rather, this evaluation value can be chosen such that the processing unit 35 recognizes burners that are already in operation and so prevents these receiving a (pointless) startup command in the form of command Z1, Z2, Z3, . . . Z8.

The main task of the processing unit 35 consists in determining, on the basis of the output signals of the signal post-processing stages NV1, NV2, NV3, . . . NV8, the next burners that are to be switched on or off by means of the commands Z1, Z2, Z3, . . . Z8. Whether the respective command Z1, Z2, Z3, . . . Z8 is a startup or shutdown command depends on to which next operating state, starting from the current operating state of the technical installation, a transition is to be made in order, for example, to achieve economical operation of the installation. If, starting from a current operating state, the installation is to be taken to an operating state which requires a higher level of firing performance, then the processing unit 35 determines startup commands as commands Z1, Z2, Z3, . . . Z8 for the burners in order to achieve economical operation of the installation, for example by switching on those burners which, in combination with the already activated burners, guarantee a homogeneous temperature profile in the combustion chamber 15.

If, on the other hand, starting from the current operating state, an operating state is required which demands a lower level of firing performance, then the processing unit 35 determines shutdown commands as the commands Z1, Z2, Z3, . . . Z8 for the burners, so burners currently in operation are selectively deactivated such that the remaining burners still in operation guarantee economical operation of the technical installation by, for example, generating a homogeneous temperature profile in the combustion chamber.

The processing unit 35 is therefore trained to selectively generate either startup or shutdown commands as commands Z1, Z2, Z3 . . . Z8, according to the requirement for a next operating state.

For further clarification, the evaluation explained by way of example in FIG. 1 shall now be shown with real numeric values for the numerical values WZ1, WZ2 and WZ3 as well as for the outputs of the signal preprocessing stages VV1 and VV2.

The burners 1 and 2 shall be assumed to have been switched on. This is reported to the signal preprocessing stages VV1 and VV2 by means of the operating state values S1 and S2 respectively. The signal preprocessing stage VV1 generates the value one from the operating state value S1 of the burner 1 and switches this according to FIG. 2 to three of the multipliers 30. The multiplier 30a is used for the evaluation of the two burners 2 and 8 adjacent to the burner 1, while the multipliers 30b and 30c are used for the evaluation of the burners 3 and 7 and 4 and 6, respectively. The burner 5 is not evaluated by the burner 1 or is evaluated with the numerical value zero. Let the values supplied to these three multipliers 30a, 30b, 30c as multipliers WZ1, WZ2, WZ3 be the constant values six, three and one, respectively. These values roughly correspond to the effect of the burners to be evaluated on the asymmetry of the flame pattern, i.e. the distances of the evaluating burner 1 from the burners to be evaluated. The output of the multiplier 30a consequently yields the value six and supplies this to the summator Σ2 (which is assigned to the burner 2) and the summator Σ8 (which is assigned to the burner 8).

The output of the multiplier 30b yields the value three, which is switched to the summators Σ3 (which is assigned to the third burner) and Σ7 (which is assigned to the seventh burner).

The output of the third multiplier 30c yields the value one, which is switched to the summator Σ4 (which is assigned to the fourth burner) and to the summator Σ6 (which is assigned to the sixth burner).

The evaluation of the other burners initiated by the burner 2 is to be performed in an analogous manner, with the result that the value six is switched to the summators Σ1 and ΣS3, the value three to the summators Σ4 and Σ8, and the value one to the summators Σ5 and Σ7.

As output values, the summators Σ1, Σ2, Σ3, Σ4, Σ5, Σ6, Σ7 and Σ8 determine the values six, six, nine, four, one, one, four and nine, respectively, by summation. Said values are switched to the corresponding subsequent signal post-processing stages NV1, NV2, NV3, ... NV8.

In an operating state to be reached next, an increase in firing performance is to be demanded, so startup commands are determined as commands Z1, Z2, Z3 ... Z8 for the burners by the processing unit 35 in such a way that the burners in operation in the next operating state have a uniform spatial distribution in the combustion chamber 15 in order thereby to achieve a homogeneous temperature profile.

As the burners 1 and 2 are already in operation, the signal preprocessing stages VV1 and VV2 switch the constant value one thousand, for example, to the processing unit 35, instead of the outputs of the summators Σ1 and Σ2; the outputs of the remaining summators Σ3, Σ4, Σ5, ... Σ8 are switched unchanged to the processing unit 35 by the following signal post-processing stages NV3, NV4, NV5, ... NV8.

In the present example the processing unit 35 is therefore provided with eight input signals in order to determine the burners to be switched on in the next step.

In the choice of the numerical values WZ1, WZ2 and WZ3 illustrated by way of example, the processing unit 35 can now determine the burners to be switched on in the next step by establishing the minimum or minima of their input values and in the next step switching on the burners associated with these minima in each case; in the following example this would mean that the burners 5 and 6 are switched on in the next step. Once burners 5 and 6 have been switched on, the burners 1, 2, 5 and 6 are in operation.

As a result of the described activation of the burners 5 and 6 in addition to the burners 1 and 2 already in operation, a uniform firing of the combustion chamber 15 is ensured, since, given the spatial arrangement of the burners according to FIG. 1, in this way opposing pairs of burners with respect to the center point of the combustion chamber 15 are operated, thus leading to a uniform firing of the combustion chamber 15 and consequently to economical operation of the technical installation.

The evaluation principle represented in FIG. 2 can be easily generalized: a certain burner is chosen as the reference burner and a first, a second and a third adjacent pair of burners are defined in relation to it. With respect to the burner 3, the first adjacent pair of burners defined in this way is the pair of burners formed by the burners 2 and 4, the second pair of burners is the pair of burners formed by the burners 5 and 1, and the third adjacent pair of burners is the pair of burners formed by the burners 6 and 8.

If the burner 3 now goes into operation, it initiates for example an evaluation of the burners 2 and 4 with the value six, an evaluation of the burners 5 and 1 with the value three, and an evaluation of the burners 6 and 8 with the value one. If another burner now goes into operation, this is chosen as the reference burner and in an analogous manner forms a further first adjacent pair of burners, a further second adjacent pair of burners, and a further third adjacent pair of burners.

FIG. 2 shows a schematic representation of a control system 1, wherein an actuation logic module 5 of the control system 1 can correspond to the computing unit 20 from FIG. 1.

Within the actuation logic module 5, commands Z1, Z2, Z3, ... Z8 are determined by means of which, in a next step, certain components of the technical installation are to be switched on and/or off.

For this purpose the actuation logic module 5 comprises a command logic module 10, as well as signal preprocessing stages VV1, VV2, VV3, ... VV8. The function of the actuation logic module 5 can be taken from the description pertaining to FIG. 1 (q.v. computing unit 20).

The control system 1 further comprises a preselection logic module 15 for generating initialization values I1, I2, I3, ... I8. In this case, said initialization values act upon summators within the command logic module 10 by means of which the numerical values of each component are added.

By means of the initialization values I1, I2, I3, ... I8 it is therefore possible to affect the summated numerical value of one or more components of the technical installation and thereby exert an influence on the determination of the commands Z1, Z2, Z3, ... Z8. In this way it is possible in particular to generate one or more unequivocal commands Z1, Z2, Z3, ... Z8, starting from an operating state of the components from which a plurality of equivalent alternatives exist for reaching a desired operating state.

Certain components of the technical installation can be addressed manually by means of a command input 20 of the preselection logic module 15, and initialization values I1, I2, I3, ... I8 assigned in each case can be set manually. This can be implemented for example by specification of a fixed constant value as command input 20, which value is added to the summated numerical value of the addressed component as an initialization value.

Apart from the cited manual generation of the initialization values I1, I2, I3, ... I8, they can be determined on the basis of operating criteria B1, B2, B3, ... B8 which are determined by an upstream operating criteria logic module 25.

Operating criteria B1, B2, B3, ... B8 of said kind can comprise information on already completed operating hours of the components, so the initialization values I1, I2, I3, ... I8 of the relevant components are determined as a function of said operating criteria B1, B2, B3, ... B8. For example, a component is assigned a high initialization value in numerical terms if the corresponding operating criterion has a high value.

The operating criteria logic module 25 also comprises inputs for capturing reset commands 30 and readiness signals 35.

The operating criteria B1, B2, B3, ... B8 can be influenced by means of the reset commands 30. For example, an operating hours counter of one or more components is reset manually by means of the reset commands 30 and hence the corresponding operating criterion is also reset.

The operating criteria B1, B2, B3, ... B8 can also include information about the availability of the components. Toward that end, readiness signals 35 are evaluated which indicate whether one or more components are ready for operation. For example, the non-availability of a component is reported by means of the readiness signals 35. The operating criteria logic module 25 thereupon sets the operating criterion assigned to this component to a corresponding value so that the preselection logic module 15 connected downstream can use this information to determine the initialization values I1, I2, I3, ... I8 in a meaningful manner.

A switching logic 40 of the control system 1 is used for determining startup commands 50 and shutdown commands 55 for components of the installation in order to respond to changed operating conditions of the technical installation which are specified, for example, as a new performance specification.

An operating condition is switched as the setpoint value specification 45 to the switching logic 40. In addition, the switching logic 40 receives operating state values S1, S2, S3, ... S8 which include information about the current operating state of the components. In this case the operating state values include at least information about which components are currently in operation.

If a new operating condition is now transferred to the switching logic 40 by means of the setpoint value specification 45, said switching logic 40 can establish, based on the knowledge of the operating state values S1, S2, S3, ... S8, which startup commands 50 and/or shutdown commands 55 must be issued in order to reach the new specified operating state according to the setpoint value specification 45.

The invention claimed is:

1. A method for operating a technical installation comprising a plurality of components, comprising:
    placing one or more of the components into operation to perform a function relating to operation of the installation or taking said one or more of the components out of operation;
    when a first of the components is placed into operation or taken out of operation, initiating an evaluation of other multiple components other than said one or more of the components with assignment of a numerical value to each;
    totaling the numerical values assigned to each of the multiple components other than said one or more of the components;
    using the totaled numerical values for each of the multiple components other than said one or more of the components to determine those of the multiple components other than said one or more of the components which will next be placed into operation or taken out of operation;
    assigning at least one of the multiple components other than said one or more of the components at least one initialization value and adding the initialization value to the totaled numerical values of the at least one of the multiple components other than said one or more of the components; and
    placing one of the multiple components other than said one or more of the components into operation to perform a function relating to operation of the installation or one of the multiple components other than said one or more of the components out of operation based on summation of numerical values.

2. The method as claimed in claim 1, wherein at least one of said plurality of components is assigned at least one operating criterion and the operating criterion influences the initialization value of the at least one of said plurality of components.

3. The method as claimed in claim 1, wherein a startup and a shutdown command is issued for at least any one of said plurality of components on the basis of a plurality of operating state values of said at least one of said plurality of components and at least one setpoint value specification.

4. The method as claimed in claim 1, wherein a startup or shutdown command is issued for at least one of said plurality of components on the basis of a plurality of operating state values and at least one setpoint value specification.

5. The method as claimed in claim 1, wherein the technical installation is a combustion system for generating electric energy.

6. A control system configured for operating a combustion system for generating electricity, comprising a plurality of components such that during operation of the technical installation, when each component is placed into operation or taken out of operation the control system initiates an evaluation of at least one other of the components by a numerical value, the control system totals the numerical values of each said at least one other of the components, and the control system uses the totaled numerical values to determine, among said at least one other of the components, those components which are to be activated or deactivated next, wherein the control system assigns to one of said at least one other of the components at least one initialization value and the initialization value is added to the totaled numerical values of the one of said at least one other of the components.

7. The control system as claimed in claim 6, wherein at least one operating criteria logic module and at least one component are assigned at least one operating criterion and the operating criterion influences the initialization value of the one of said at least one other of the components.

8. The control system as claimed in claim 6, wherein the control system issues switching logic by a startup and/or shutdown command for the one of said at least one other of the components on the basis of an operating state values and at least one setpoint value specification.

* * * * *